United States Patent [19]

Bräkelmann et al.

[11] 4,368,753
[45] Jan. 18, 1983

[54] DOUBLE-SEAT VALVE UNIT LEAKAGE CONTROL

[75] Inventors: Wolfgang Bräkelmann, Unna-Lünern; Günter Smusch, Werne, both of Fed. Rep. of Germany

[73] Assignee: Holstein & Kappert GmbH, Dortmund, Fed. Rep. of Germany

[21] Appl. No.: 269,831

[22] Filed: Jun. 2, 1981

[30] Foreign Application Priority Data

Aug. 16, 1981 [DE] Fed. Rep. of Germany ....... 3030989

[51] Int. Cl.³ .......................... B08B 9/02; F17D 3/01
[52] U.S. Cl. .................................. 137/240; 137/312; 137/614.17; 137/614.18; 137/614.19; 137/637.2; 137/315; 134/166 C
[58] Field of Search ............... 137/237, 238, 240, 312, 137/614.16, 614.17, 614.18, 614.19, 637.2, 454.2, 454.6, 315; 251/360; 134/166 C

[56] References Cited

U.S. PATENT DOCUMENTS

| 3,076,474 | 2/1963 | Skomp | 137/312 |
| 4,274,433 | 6/1981 | Schnall | 137/454.6 |
| 4,304,251 | 12/1981 | Schädel | 137/637.2 |

FOREIGN PATENT DOCUMENTS

| 521081 | 7/1953 | Belgium | 137/454.2 |
| 2532838 | 1/1977 | Fed. Rep. of Germany | 137/312 |
| 2623301 | 12/1977 | Fed. Rep. of Germany | 137/240 |
| 2808094 | 8/1978 | Fed. Rep. of Germany | 137/454.2 |

Primary Examiner—George L. Walton
Attorney, Agent, or Firm—Michael J. Striker

[57] ABSTRACT

A double-seat valve unit with leakage control has a greater valve plate located below a smaller valve plate, adjusting bars connected with the valve plates and arranged so that the adjusting bar of the greater valve plate extends through the interior of the adjusting bar of the smaller valve plate and both valve plates move to an open position from above downwardly, a leakage conduit having a portion located inside a valve housing and movable outwardly, an annular gap formed between the adjusting bars for flowing of cleaning fluid, and a return valve formed by the lower valve plate.

10 Claims, 1 Drawing Figure

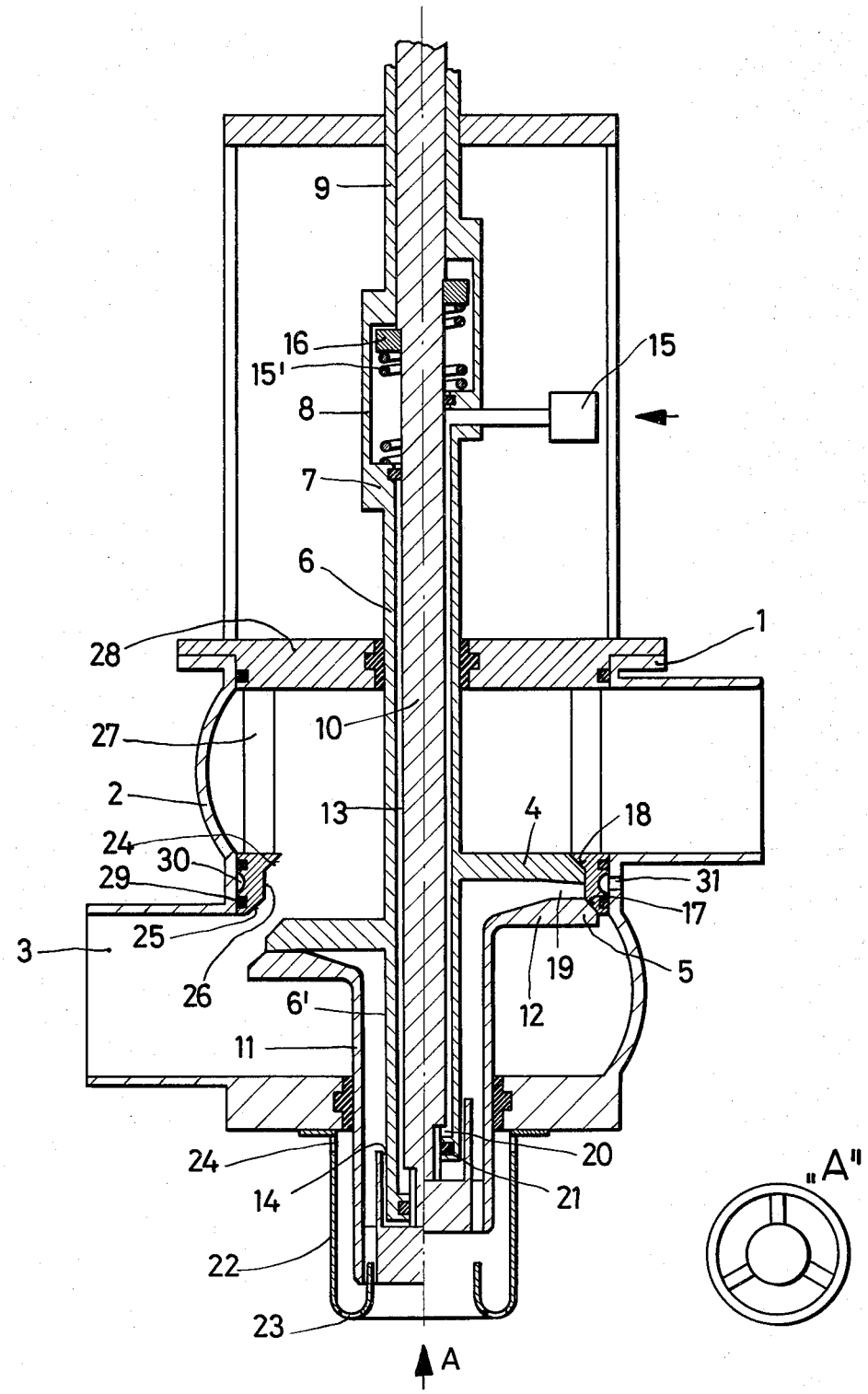

DOUBLE-SEAT VALVE UNIT LEAKAGE CONTROL

BACKGROUND OF THE INVENTION

The present invention relates to a double-seat valve unit with a leakage control. More particularly, it relates to a double-seat valve unit which has two independently movable valve plates of which one valve plate abuts against the other valve plate during opening after a predetermined stroke so as to form an inner chamber from which a leakage conduit leads to open air.

With the increasing automatization of the beverage industry, the requirements are made to provide for an automatic cleaning of the flow path of the product. In connection with this, program controlled chemical cleaning processes are proposed which allow remote control of cleaning operations. Valves are proposed which can be utilized for the thus produced and exactly determine working operations. When such valves are utilized, for example, in tank batteries, the individual working steps such as filling, emptying, cleaning and disinfecting must be performed in a simple way. Because of the strict safety requirements, an unobjectionable separation of the product from the cleaning fluid is necessary. For this reason, valves with two valve plates are utilized, particularly in the beverage industry. The valve plates which move relative to one another form an inner chamber which communicates with a leakage fluid conduit having a free end spaced from the valve seats and leading to open air. In such a construction, insufficient tightness of the valve can be fast recognized by an outwardly flowing leakage fluid and eliminated before inflicting further damages. In order to make easier dismounting in the event of some failures, the greater valve plate is located in the known constructions in the upper region. The smaller valve plate is located under the greater valve plate and moves from below upwardly to an opening position. In this operation the adjustment arrangement is actuated, and then the lower smaller valve plate first after a small partial stroke moves to abut against the greater valve plate, and thereupon both valve plates are removed from their seats. Such construction is discloased, for example, in the German Auslegeschrift No. 2,532,838.

The above-described double-seat valve unit possesses, however, a considerable disadvantage. This disadvantage resides in the fact that a portion of the leakage fluid conduit which extends outwardly of the housing moves during a switching step into the housing. Thereby an infection of the medium accommodated inside the housing by bacteria deposited on the shaft of the leakage fluid conduit is not excluded.

Moreover, the location of the smaller valve plate below the greater valve plate, particularly in condition of unavoidable back strokes in the lower housing region, causes the danger that both valve plates are shortly lifted from their seats and thereby mixing of the media which must be separated from one another can take place.

SUMMARY OF THE INVENTION

Accordingly, it is an object of the present invention to provide a double-seat valve unit which avoids the disadvantages of the prior art.

More particularly, it is an object of the present invention to provide a double-seat valve unit which allows unobjectionable insertion of all important parts from above, on the one hand, and movement of the valve plates to the open position upwardly opposite to the direction of insertion, on the other hand.

It is another object of the present invention to provide a double-seat valve unit which attains the above-mentioned objects and in addition the lower greater valve plate performs the functions of a return valve, and the leakage fluid conduit does not move inside the valve housing and the leakage hollow space can be gap-less.

In keeping with these objects and with others which will become apparent hereinafter, one feature of the present invention resides, briefly stated, in a double-seat valve in which a greater valve plate is located below a smaller valve plate, and an adjustment bar of the greater valve plate extends through an adjustment bar of the smaller valve plate and both valve plates move from above downwardly to an open position, wherein a leakage conduit portion in a valve housing can move partially outside, an annular gap for passing a cleaning fluid is formed between the adjusting bars of the valve plates, and the lower valve plate is formed as a return valve.

In accordance with another feature of the present invention the annular gap for the cleaning fluid extends downwardly to the region of an outlet opening of the leakage conduit and communicates with a turning passage which turns the cleaning fluid upwardly.

The particular advantage of the double-seat valve unit designed in accordance with the present invention is that during mounting from above, the greater valve plate is arranged below the smaller valve plate and the opening movement of both valve plates is performed downwardly. Thereby, the pressure impacts in the conduits are provided without causing damages because of the formation of the greater valve plate as return valve. Moreover, the outwardly located portion of the leakage conduit or the valve shaft of the greater valve plate do not move in the interior of the valve housing. Thereby infections from the surrounding atmosphere cannot enter the valve unit.

In accordance with yet another feature of the present invention, the inner adjusting bar of the greater valve plate is provided with movement securing means arranged below both valve seats. Thereby, the upper outwardly extending connecting and guiding region can be maintained extremely short.

Still a further feature of the present invention is that the outwardly extending end of the leakage conduit is in correspondence with a turning chamber which turns the cleaning fluid against the leakage conduit outer surface region extending to open air. Such a construction has the advantage in the fact that the cleaning fluid prior to finally flowing to open air or in drain, is again turned after leaving the leakage pipe itself and flows on the outer surface of the leakage conduit. Only then it flows directly below the valve housing outwardly.

In accordance with a further advantageous feature of the present invention, the turning chamber is provided at its lower end with additional emptying openings. The openings may be selected so that they drain the eventually flowing leakage fluid. As soon as, however, the cleaning fluid for cleaning the inner chamber between the valve plates is supplied, it cannot exit through the emptying openings, so that turning of at least a partial stream of the cleaning fluid along the outer surface of the leakage pipe takes place. The cleaning fluid flowing in greater circumference can exit through the respectively greater openings. The determination of the openings relative to one another is performed so as to reliably avoid formation of pressure inside the leakage pipe in the event of leakage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a view showing a double-seat valve with a leakage control in accordance with the present invention.

DESCRIPTION OF A PREFERRED EMBODIMENT

A double-seat valve unit in accordance with the present invention has a double housing which is identified by reference numeral 1 and has spherical housing parts 2 and 3. The housing is formed as a multi-way distributor and has a plurality of ports for a conduit system.

Two valve plates 4 and 5 move inside the housing 1 independently of one another. The valve plate 4 is located, in the plane of the drawing or in the plane of insertion of the parts of the valve unit, above the valve plate 5. The valve plate 4 is connected with a hollow adjustment bar 6 which extends upwardly and outwardly beyond the housing 1. The adjustment bar 6 has a thicker portion 7 which is connected with a pipe 8. The upper end of the pipe 8 is releasably connected with a piston rod 9 of a not shown adjustment arrangement.

An adjustment bar 10 is located inside the hollow adjustment bar 6 and also extends outwardly of the housing 1. The adjustment bar 10 is connected in its lower region with a leakage pipe or a leakage conduit 11. The leakage conduit 11 is a part of a member 12 forming the lower valve plate 4.

The adjustment bar 6 and the adjustment bar 10 form therebetween an annular gap 13 which extends from the thicker portion 7 to the lower region of the adjusting bar 10. An upwardly extending turning passage 14 which turns upwardly the cleaning fluid is connected with the annular gap 13. A joint 15 arranged at the upper end of the annular gap 13 at the level of the thicker portion 7 serves for supplying a cleaning fluid. A pressure spring 15' is arranged inside the pipe 8 and abuts against the thicker portion 7, on the one hand, and against a flange 16 of the inner adjustment bar, on the other hand. The function of the pressure spring 15' is to urge the lower greater valve plate 5 against its associated valve seat 17 or during displacing of the upper valve plate 4 from its seat 18 to urge the valve plate 5 against the valve plate 4.

As soon as the piston rod 9 moves downwardly under the action of the associated adjustment piston, the valve plate 4 is lifted from its seat and abuts against the valve plate 5 which is held under the spring action. Thereby an inner chamber 19 is formed between both valve plates 4 and 5. This inner chamber communicates with the leakage conduit 11 extending downwardly and leading outside of the housing. During cleaning of this region, the cleaning fluid flows through the annular gap 13 into the associated passage 14 along the wall 6 of the adjusting bar 6, reaches the inner chamber 19, and then flows from the latter along the opposite wall of the leakage conduit 11. In the closed valve or during abutment of both valve plates 4 and 5 against their seats, the thus formed greater chamber is also available for acting by the cleaning fluid.

The adjusting bar 10 is provided in the region of the passage 14 with a step 20 associated with an inner ring 21 of the adjusting bar 6. This formation is provided to prevent seizing of the valve plate 5 in the open position. As soon as both valve plates 4 and 5 move from the open position to the closed position, the lower valve plate 5 is comoved under the action of the pressure spring 15'. When, however, for some reasons clamping of the valve plate 5 takes place, the inner ring 21 will lie against the step 20 and thereby release the valve plate 5 from clamping, so that the valve plate 5 is against moved under the action of the pressure spring 15' to its required position.

Since the greater valve plate is located below the smaller valve plate, the pressure impacts which are transmitted to the housing 3 can be easily cushioned without damages. In other words, opening of the valve and thereby produced mixing of the different fluids in both housing parts 2 and 3 is eliminated.

A turning chamber 22 is associated with an outwardly extending end portion of the leakage conduit 11. The turning chamber 22 provides for turning of the cleaning fluid against the outer surface of the leakage conduit which extends outwardly. The turning chamber 22 has at its lower end additional emptying openings 23. It also has openings 24 arranged in another region. The openings 23 and 24 of the turning chamber 22 have such dimensions, that the total cross-section of these openings is greater than the outlet cross-section of the leakage conduit. Thereby backflow of both the cleaning fluid and the leakage fluid is eliminated. Moreover, the provision of the emptying openings 23 guarantees that the turning chamber 22 is always available for flowing through.

The valve seats 17 and 18 are defined by seat faces 24 and 25 which is formed on a ring member 26. The latter is releasably mounted in the housing 1 with the aid of supporting bars 27 which are connected with an upper flange 28 of the housing part 2. The ring member 26 can be withdrawn from the housing 1 together with the inner valve parts. The ring member 26 is sealed relative to the housing 1 by, for example, two annular sealing members 29 which are spaced from one another. An annular groove 30 is provided in the ring member 26 between the sealing members 29 and associated with openings 31 for flowing the leakage fluid to open air.

It will be understood that each of the elements described above, or two or more together, may also find a useful application in other types of constructions differing from the types described above.

While the invention has been illustrated and described as embodied in a double-seat valve unit with leakage control, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A double-seat valve unit with a leakage control comprising a housing having an upright axis and provided with two seats; upper and lower valve plates cooperating with said seats and movable independently of one another from above downwardly to an open position in which said valve plates abut against one another and bound an inner chamber therebetween and also movable upwardly to a closed position in which they abut against said seats, said upper valve plate being smaller and said lower valve plate being greater; means for supplying a cleaning fluid; two adjusting bars each connected with a respective one of said valve plates so as to move the same and arranged so that the adjusting bar of said lower valve plate extends through the interior of the adjusting bar of said upper valve plate and an annular gap is formed therebetween, said means for supplying a cleaning fluid communicating with said gap for passing the cleaning fluid through the latter; a leakage conduit communicating said inner chamber formed between said valve plate with open air and having a portion located in said housing and partially movable outwardly of said housing in said open position, said lower valve plate forming a return valve; and movement securing means arranged to guarantee unobjectionable movement of said valve plates and provided on the adjusting bar of said lower seat, which extends inside the adjusting bar of said upper seat, said movement securing means being located below said seats.

2. A double-seat valve unit with a leakage control comprising a housing having an upright axis and provided with two seats; two valve plates cooperating with said seats and including an upper smaller valve plate and a lower greater valve plate arranged so that they can be disassembled upwardly and movable independently of one another downwardly to an open position in which said valve plates abut against one another and bound an inner chamber therebetween, said upper valve plate being smaller and said lower valve plate being greater; means for supplying a cleaning fluid; two adjusting bars each connected with a respective one of said valve plates so as to move the same and arranged so that the adjusting bar of said lower valve plate extends through the interior of the adjusting bar of said upper valve plate and an annular gap is formed therebetween, said means for supplying a cleaning fluid communicating with said gap for passing the cleaning fluid through the latter; a leakage conduit communicating said inner chamber formed between said valve plate with open air and partially movable outwardly of said housing in said open position, said lower valve plate forming a return valve.

3. A double-seat valve unit as defined in claim 2, wherein said leakage conduit has an outlet opening, said annular gap between said adjusting bars extending downwardly to a region located adjacent to said outlet opening of said leakage conduit; and further comprising a turning passage communicating with said annular gap in said region and arranged to turn upwardly the cleaning fluid.

4. A double-seat valve unit as defined in claim 3; and further comprising means which forms a cleaning fluid turning chamber communicating with said leakage conduit and having a lower part provided with additional leakage openings.

5. A double-seat valve unit as defined in claim 4, wherein said annular gap, said turning-passage, said leakage conduit and said turning chamber are located concentrically to and successively communicate with each other.

6. A double-seat valve unit as defined in claim 2; and further comprising a ring member releasably mounted in said housing and forming said seats, and means for releasably mounting said ring in said housing.

7. A double-seat valve unit as defined in claim 6, wherein said housing has an upper flange, said mounting means including supporting bars connecting said ring member with said flange.

8. A double-seat valve unit as defined in claim 6; and further comprising means for sealing said ring member relative to said housing and arranged between the former and the latter.

9. A double-seat valve unit as defined in claim 8, wherein said sealing means includes two sealing members arranged between said ring member and said housing and spaced from one another, and an annular groove provided between said sealing member and communicating with open air.

10. A double-seat valve unit as defined in claim 9, wherein said ring member has an outer surface, said annular groove being formed in said outer surface of said ring member.

* * * * *